Figure 3:
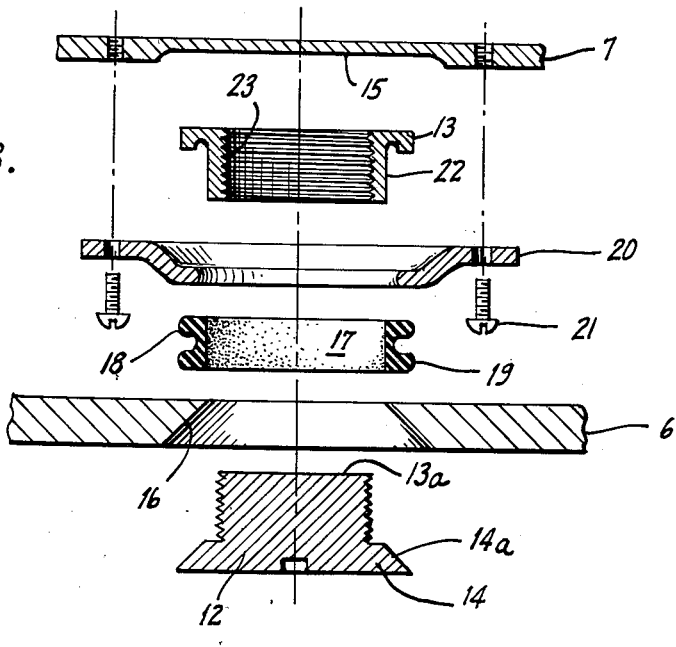

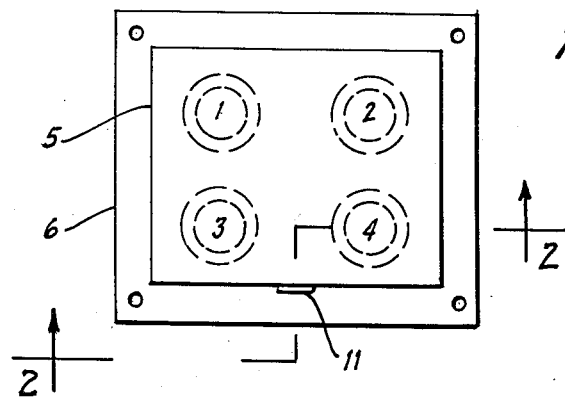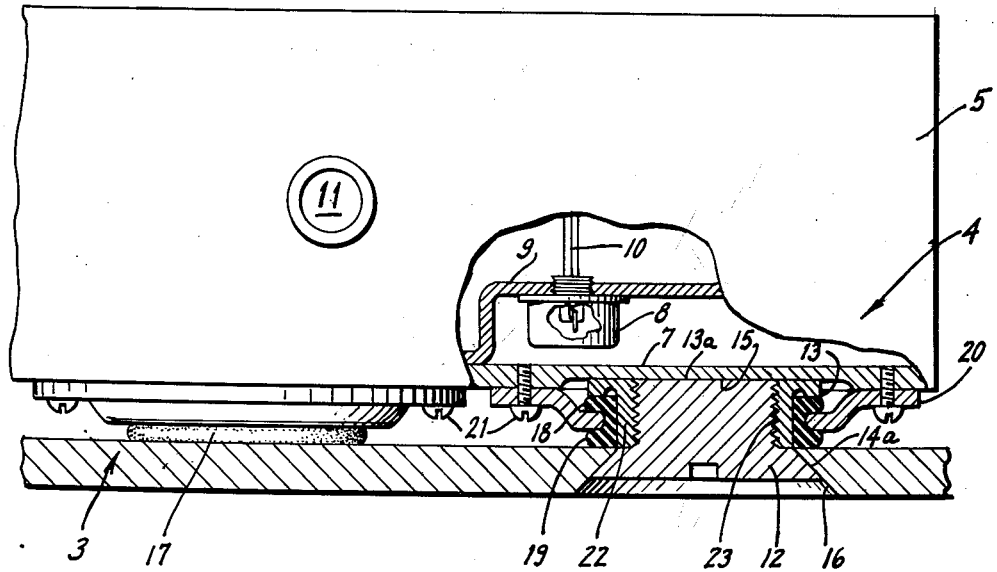

Feb. 26, 1963 R. TIEGEL 3,079,132
MOUNTING STRUCTURE FOR SENSITIVE INSTRUMENTS WHICH
MUST BE EXPOSED TO WIDELY CHANGING CONDITIONS
Filed May 10, 1961 2 Sheets-Sheet 2

INVENTOR.
RALPH TIEGEL
BY
F. D. Prager
ATTORNEY

United States Patent Office 3,079,132
Patented Feb. 26, 1963

3,079,132
MOUNTING STRUCTURE FOR SENSITIVE INSTRUMENTS WHICH MUST BE EXPOSED TO WIDELY CHANGING CONDITIONS
Ralph Tiegel, Redwood City, Calif., assignor, by mesne assignments, to Philco Corporation, Philadelphia, Pa., a corporation of Delaware
Filed May 10, 1961, Ser. No. 109,084
13 Claims. (Cl. 165—53)

Numerous problems are encountered in the construction of instrumented devices which must operate under variable conditions, and some of the greatest difficulties relate to the protection of the instruments in such a unit. Delicate instruments must often be carried, preserved, and operated under radically changing conditions, particularly as to operating temperature and traveling speed. While such is the case in many scientific and industrial processes, the discussion which follows concentrates specifically on the instrumentation of satellites or missiles to be launched into space.

During launching the shell of a missile vibrates strongly and in order that the vibration may not injure instruments in the missile it is necessary to isolate an instrument unit or package from rigid contact with the shell, for instance by a resilient mounting pad. Similar precautions are generally required for re-entry and landing. However, instruments to be operated during extended periods of travel must also have a broad and firm mounting base on the missile shell to provide for proper control over operating temperatures. For instance it is often necessary to dissipate heat, generated in an instrument package, into outer space. The conflict between the requirements is evident; the mounting of an instrument unit cannot be rigid as well as non-rigid. At least it cannot comply with both requirements at the same time.

It has therefore been desired to provide an arrangement which automatically adapts the instrument mounting to prevailing and urgent requirements and which for instance at the proper times establishes, disestablishes and reestablishes rigid contact between an instrument package and its mounting base or platform. It has been desired more specifically to arrange a unit so that during and by the occurrence of vibration, such for example as occurs in the shell of a missile, the direct and rigid contact of mounting elements is broken. It has been desired also to achieve this by prompt and safe automatic action, not dependent on further instrumentation, and to make the automatic mount as compact and reliable as possible.

The invention has reached these objectives by providing a new arrangement of simple structural elements. According to a preferred embodiment of the invention a resilient mounting pad, disposed between mutually opposing surfaces of an instrument package and a mounting base, is associated with a rigid contact member which resembles a resiliently installed rivet and which has spaced surfaces respectively engageable with certain confronting areas (normally overlying said surfaces) subject to control action in response to the vibration or non-vibration of the mounting base.

The control action is such that the mounting of the instrument package is firm and rigid and provides a maximum of heat-conduction when the base does not vibrate, but is resilient and still adequately heat conductive while the base vibrates. The way in which the change-over is achieved will best be described hereinafter, with reference to the preferred construction incorporating this invention; however it may here be noted that in such a construction the rivet-like member presents two surfaces to overlying surfaces of rigid members, potentially in metal-to-metal contact. An added system of surfaces is provided, including certain surfaces of the resilient pad, which latter system selectively maintains contact between the metal parts. Suffice it to say at this point that these several elements and surfaces cooperate at the inception of each vibratory and non-vibratory state of the mounting base to shift two pairs of metal surfaces into one of two predetermined arrangements and conditions, which is then substantially maintained so long as said vibratory or non-vibratory state prevails.

The way in which the resilient pad, the intermediate contact member and their associated elements perform these functions, as well as the advantages gained thereby, will best be considered in connection with the drawing of a preferred embodiment of this invention which is appended hereto.

Figure 4:
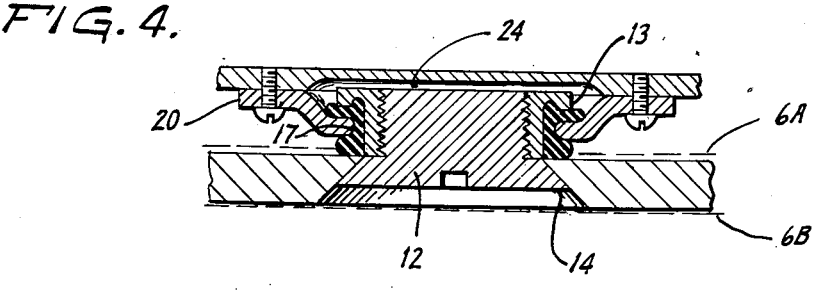
Figure 5:
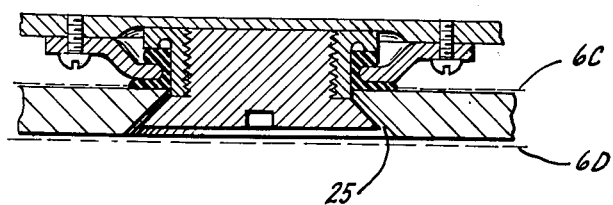

In this drawing, FIGURE 1 is a simplified plan view of an instrument package installed on a mounting base by a series of mounting structures which incorporates the present invention. FIGURE 2 is a view taken generally along line 2—2 in FIGURE 1 and drawn on a larger scale, the new mounting structures being shown in their normal (non-vibratory) operating condition. FIGURE 3 is an exploded view of elements shown in FIGURE 2. FIGURE 4 shows the structure in an arrangement thereof which is substantially maintained during another (vibratory) operating condition of the mounting base. FIGURE 5 shows the structure in a third arrangement thereof, which is maintained during still other types of (vibratory) conditions.

As indicated by FIGURE 1, mounting structures 1, 2, 3, 4 are provided to support an instrument package or cabinet 5 on or from a metallic mounting base or plate 6. Said base can be part of or firmly secured to the shell structure of a missile or space vehicle. Cabinet 5, as shown in FIGURE 2, has a metallic bottom plate 7 supporting heat sensitive and vibration sensitive components, such as transistors 8, by means of metallic bracket structure 9. Connector leads 10 of the transistors extend to a suitable cable connection 11, shown as provided on a side wall of said cabinet 5. It is believed unnecessary for present purposes to describe the instrumentation or circuitry in greater detail.

In accordance with the invention an intermediate mechanical contact member 12 is provided, which is shown in form of a massive, metallic plug or shank extending through base plate 6 toward instrument cabinet 5. A pair of flanges 13 and 14 are provided on axially spaced portions or ends of this shank and each end or flange has a smooth surface 13a, 14a. Both surfaces are shown as facing upwardly although the lower surface 14a also faces outwardly. They engage, respectively, a bottom surface area 15 of cabinet plate 7 and a bottom surface area 16 of mounting plate 6. Both pairs of surfaces 13a—15 and 14a—16 are shown in FIGURE 2 as being in metal-to-metal contact.

To maintain such contact, in the absence of base plate vibration, an elastic pad structure 17 is used, which is shown as a unitary, ring-shaped grommet having upper and lower flanges 18, 19. The grommet can be made of rubber or the like. The top surface of its upper flange 18 bears against the underside of the upper flange 13 of metallic shank 12, while the elastic bottom surface of the lower grommet flange bears against the rigid top surface of mounting plate 6. Cabinet 5 is connected with grommet 17 by means of a metallic, annular retainer 20, having upper and lower surfaces of an inner edge portion engaging the resilient grommet between lower and upper surfaces of flanges 18, 19. Retainer ring 20 also has an outer edge portion, lying in a plane parallel to but offset from that of said inner edge portion and rigidly secured to the underside of cabinet bottom plate 7 by fasteners 21.

The resilient grommet 17 is shown as being held to the rigid shank 12 by a shank element 22 which provides the upper flange 13 of the shank. This element 22 can be secured to the body of the shank for instance by screw threads 23.

A suitable way in which the several parts can be combined and the entire mounting unit constructed may best be explained in connection with FIGURE 3. As an initial step, the body of the upper shank element 22 can be inserted downwardly through the aperture provided by the inner edge portion of retainer ring 20 and said retainer ring can then be secured to plate 7 by fasteners 21. Thereafter grommet 17 can be slipped onto shank element 22. In order to incorporate this grommet in the mounting unit, the body of the lower shank element can then be upwardly inserted, through mounting plate 6, into shank element 22, causing upper grommet flange 18 to bear upwardly against flange 13 on shank element 22, while the lower grommet flange 19 bears downwardly against plate 6. In order to establish firm, vibration-proof engagement between shank portions 12, 22 it is possible, after initial loose assembly of these portions, manually to press the cabinet down into a position like that of FIGURE 5 and then to turn the lower shank portion into the upper shank element sufficiently to prevent any subsequent shaking loose of the element 22, from the shank assembly.

Under normal, non-vibratory conditions, such as coasting or orbiting flight of a missile, the position shown in FIGURE 2 is maintained wherein grommet 17, as shown, resiliently holds shank 12 in raised position by means of the upper grommet flange 18, thereby engaging the lower flange surface 14a of the shank with surface 16 on the underside of mounting plate 6. Another effect of grommet 17, in this operative condition, is that the lower grommet flange 19 resiliently supports retainer 20 and thereby cabinet 5, by engagement of said retainer with the grommet portion between the two grommet flanges, this resilient support being such that the weight —if any—of cabinet 5 and/or the resilience of the upper grommet flange 18 causes maintenance of contact between the underside 15 of cabinet plate 7 and the top surface 13 of the shank. As metal-to-metal contact is accordingly normally maintained both at 13a—15 and at 14a—16, heat generated in transistors 8 can readily be removed from cabinet 5 by means of conduction through bracket structure 9, plate 7, shank 12 and mounting base 6.

During a missile launching operation the mounting base 6 is almost certain to vibrate strongly, although the exact mode of vibration is in many cases unpredictable, being dependent on variables both within the missile and outside the same. The vibration of base 6 is imparted to the lower flange 19 of resilient grommet 17.

Initial vibratory effects are also transmitted to instrument package 5, by resilient grommet 17, but this latter transmission is elastic, whereby the new mounting structure is effective substantially to cause vibration isolation for package 5. At the same time the new arrangement maintains appreciable heat conductance from package 5 to plate 6, even while the unit vibrates. The operation can most simply be outlined as follows.

It can be assumed that the vibratory force causes distortions and/or excursions of the missile shell, including for instance small motions between upwardly spaced limits 6A, 6B in FIGURE 4. When disregarding other variables and forces and merely assuming that the base plate is swinging from upper limit 6A toward lower limit 6B, the instrument package tends to lift off temporarily and to form gap 24 between shank 12 and the package. Thereafter and during the opposite swing (FIGURE 5) from lower limit 6D to upper limit 6C the unit tends to open a gap 25 between shank 12 and the base plate.

In this way gaps 24, 25 are alternately formed between normally mutually contacting metal surfaces of instrument cabinet 5, mounting base 6, and intermediate contact member 12. The exact time cycle of this operation depends on the mode and amplitude of the vibration of the base plate, but in all cases the mutual contacting of metal surfaces, incident to the closing of gaps 24, 25, is damped by the resilience of rubber grommet 17. Thus it will be seen that the instrument package, mounted on and by the new structure, does not partake of vibrations which in any way resemble those between limits 6A, 6B; rather, the instrument package tends to remain more or less fixed in space and is merely subjected to alternate forces, directed upwardly when gap 24 closes and directed downwardly when gap 25 closes, said forces being greatly damped and therefore harmless. It will also be seen that appreciable outflow of heat from the package to the shell continues as shank 12 in effect reciprocates between these units.

When the missile or vehicle then begins to coast, the strong vibrations of the shell can be expected to attenuate and disappear. It will be seen that the normal condition shown in FIGURE 2 is then re-established automatically by the resilient forces which the grommet ring 17 applies to mounting base 6, shank 12, and cabinet retainer 20. Under this condition, the surfaces 13a and 14a are again, respectively, in static metal-to-metal contact with the fixed structures 7 and 6.

In case of vibrations of the shell plate transverse to those which have been mentioned above, the unit responds as follows. Assuming for instance that support plate 6, shown in FIGURE 1, vibrates in any one of the various directions lying in the plane of that figure, it will readily be noted from FIGURE 2 that such vibration is positively transmitted only to the tubular portion of grommet 17, which in turn transmits this kind of vibration in greatly damped form to the inwardly facing edge of cabinet retainer 20. Said retainer and the cabinet thereon are therefore free to some extent to slide back and forth relative to plate 6, in a plane parallel to that of said plate, in response to this mode of vibration. In this case damping is achieved not only by the elasticity of the grommet but also by the friction of the metal surfaces sliding relative to one another. Conductive transfer of heat continues substantially undiminished during this particular type of vibration.

In case of torsional rotation, having components lying in the plane of FIGURE 1 and other components transverse of said plane, the motions of cabinet 5 relative to support plane 6 will readily be seen to be of a mixed type, comprising components of the several types which have been discussed hereinabove.

Finally it will be understood that the static effect, applied by the grommet ring as shown in FIGURE 2, as well as the dynamic effects indicated in FIGURES 4 and 5, are substantially independent of the question of whether the structure is disposed in the orientation shown herein or whether it is turned or overturned, for instance into an upsidedown version of FIGURE 2 or into a version turned by 90 degrees, or by some other angle. The gravitational effects caused by the mass of the cabinet package 5 are of course subject to variation (assuming that the missile is under the influence of appreciable terrestial or other gravity) but it will readily be seen that the resilient forces, applied by the grommet ring, can be caused to exceed such gravitational effects to a sufficient extent to make the above-described operation substantially independent of the missile's distance from and position relative to the earth.

Only a single embodiment of the invention has been described in detail, but the specific features thereof must not be construed as limitative of the invention except insofar as is consistent with the scope of the following claims.

I claim:

1. In a structure for mounting an object on a base: a shank extending through an aperture in said base and having spaced outwardly extending portions, one on each side of said base; resilient pad means disposed on one side of said base below one of said outwardly extended portions to hold the other such portion against the other side of said base, said object being secured to said resilient means between said one side of the base and said one outwardly extended portion to normally hold said object against said shank in the region of said one such portion.

2. As a means for mounting an instrument cabinet, to be used under widely changing conditions, on a rigid metallic base plate: a rigid metallic plug extending through an aperture in said plate, one end portion of said plug having a flange outwardly extending therefrom to engage a generally outer surface of said plate and the opposite end portion of said plug having a flange outwardly extending therefrom and spaced from a generally inner surface of said plate; resilient grommet means substantially encircling said plug between the latter flange and said inner surface and reacting therebetween; and a rigid cabinet retainer, engaging the resilient grommet means between said latter flange and said generally inner surface and normally holding the instrument cabinet against said plug.

3. Apparatus for mounting an instrument package on a vibratory platform such as a missile shell, comprising a metallic contact member extending through an aperture in said platform, having inner rigid flange means facing a mounting side of said platform and having outer rigid flange means facing the other side of said platform; a metallic retainer ring secured to said package and having a rigid, inwardly presented edge portion disposed between said inner rigid flange means and said mounting side of said platform; and a pair of resilient ring means, including a first such means between said inner rigid flange means and said edge portion, the second such means being disposed between said edge portion and said mounting side of said platform and the arrangement being such that said pair of ring means tend under static conditions to hold said package to said contact member, while holding said outer rigid flange means to said platform.

4. Apparatus as described in claim 3 wherein said first and second resilient means jointly form a flanged grommet ring surrounding said contact member.

5. Apparatus as described in claim 3 wherein said retainer ring includes flat structure lying in a plane parallel to and offset from said inwardly presented edge portion, said flat structure being secured to said package.

6. Apparatus for mounting a structure on a base with rigid contact when the base is substantially free of vibration and with resilient contact when the base vibrates, comprising: a resilient grommet on a mounting surface of said base; a retainer connecting said package with a portion of said grommet spaced from the ends of the grommet; and a shank having one end supported on said grommet for normal contact with said structure, having a body extending through said grommet and base, and having another end normally held by means including the grommet in contact with another surface of said base.

7. Apparatus as described in claim 6 wherein said structure, said base and said shank substantially consist of heat-conductive metal, so as to establish a thermal bond between said structure and said base when providing said rigid contact.

8. In a structure of the indicated type, a metallic mounting base; a cabinet overlying a normally upper surface of said base; a metallic member extending through said base, having a normally lower flanged portion adapted to engage a normally lower surface of the base, said member having a normally upper flanged portion adapted to contact a surface normally forming the underside of said cabinet; and non-rigid means reacting between said base, said cabinet and said member in such a way that the normally lower flanged portion of said member tends yieldingly to engage the normally lower surface of the base and that the surface normally forming the underside of the cabinet tends yieldingly to engage the normally upper flanged portion of said member.

9. Apparatus as described in claim 8 wherein said non-rigid means comprises resilient ring structure encircling said metallic member and disposed between said normally upper surface of said base and said normally upper flanged portion of said member.

10. A fixture for mounting a cabinet for sensitive instruments on a shell plate of a container, for normally utilizing said plate as a heat sink for said instruments, and for protecting said instruments from vibrations of said shell plate, said fixture comprising a rivet-like structure extending through an aperture in said shell plate and having spaced flanges, one on each side of said shell plate; resilient pad means so disposed on one side of said shell plate, below one of said flanges, as to hold the other flange against the other side of said shell plate; and means for securing said cabinet to said resilient pad means, between said one side of the shell plate and said one flange, in such a way as normally to hold said cabinet against said rivet-like structure in the region of said other flange.

11. A fixture as described in claim 10 wherein said resilient pad means is a grommet ring surrounding said rivet-like structure and disposed between said one side of the shell plate and said one flange, said means for securing said cabinet being a rigid ring, interiorly engaging said grommet ring between terminal flanges of the grommet ring.

12. In a mounting, vibration isolating and heat dissipating structure for electronic instruments: a metallic base plate; a metallic instrument carrier plate overlying the inside of said base plate; and a plurality of mounting units, each comprising a metallic member extending through said base plate, such member having an outer flange-like portion adapted to contact an outer surface of the base plate and having an inner flange-like portion adapted to contact the underside of said instrument carrier plate; each mounting unit also comprising yielding means reacting between said base plate, said carrier plate and said metallic member in such a way that the inner and outer flange-like portions of said metallic member tend yieldingly to engage respectively said outer surface of the base and said underside of the carrier plate.

13. Apparatus as described in claim 12 wherein said base plate is a shell plate of a guided missile.

References Cited in the file of this patent

UNITED STATES PATENTS

| | | |
|---|---|---|
| 2,289,514 | Mastney | July 14, 1942 |
| 2,425,565 | Robinson | Aug. 12, 1947 |
| 2,744,718 | Markowski | May 8, 1956 |

FOREIGN PATENTS

| | | |
|---|---|---|
| 761,767 | Great Britain | Nov. 21, 1956 |